(12) United States Patent
Wright et al.

(10) Patent No.: US 6,790,356 B2
(45) Date of Patent: Sep. 14, 2004

(54) OIL FILTER ASSEMBLY

(75) Inventors: Allen B. Wright, Hope Mills, NC (US); Timothy Alan Byrd, Fayetteville, NC (US); L. Steven Cline, Fayetteville, NC (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/099,485

(22) Filed: Mar. 15, 2002

(65) Prior Publication Data

US 2003/0173281 A1 Sep. 18, 2003

(51) Int. Cl.$^7$ .............................................. B01D 35/16
(52) U.S. Cl. ....................... 210/248; 210/428; 210/440
(58) Field of Search ................................ 210/248, 428, 210/440

(56) References Cited

U.S. PATENT DOCUMENTS

| | | |
|---|---|---|
| 3,725,990 A | 4/1973 | Petersen et al. |
| 5,098,559 A | 3/1992 | Mack et al. |
| 5,589,060 A | 12/1996 | Gebert et al. |
| 5,814,215 A | 9/1998 | Bruss et al. |

FOREIGN PATENT DOCUMENTS

| | | |
|---|---|---|
| DE | 43 31 698 A1 | 3/1995 |
| GB | 2 162 079 A | 1/1988 |
| WO | WO 01/12294 A1 | 2/2001 |

*Primary Examiner*—Matthew O. Savage
(74) *Attorney, Agent, or Firm*—Barnes & Thornburg LLP

(57) ABSTRACT

An oil filter assembly comprising: an oil filter housing defining an oil filter chamber adapted to receive an oil filter element, the oil filter housing also defining a port; and a valve assembly received within the port, the valve assembly having a closed position and an open position for draining the chamber of oil associated with the oil filter element, the valve assembly comprising a spring, a valve and a casing disposed about the spring and the plunger. The casing may include a substantially annular lip retaining the valve in engagement with the casing. The casing defines a casing chamber and the lip retaining a collar of the valve within the casing chamber. The lip also may define a hole for receiving the stem or, in accordance with an alternative embodiment, for receiving a post or the like associated with the oil filter element. A method is also provided of producing an oil filter assembly having a housing defining an oil filter chamber adapted to receive an oil filter element. The method comprises the steps of: disposing a casing about a spring and a valve; forming a lip on a leading edge of the casing for retaining the valve in engagement with the casing; and inserting the casing into a port defined by the housing.

16 Claims, 5 Drawing Sheets

OIL FILTER ASSEMBLY

BACKGROUND

The present invention relates to filter assemblies for filtering fluids in a work apparatus such as an internal combustion engine.

Certain oil filter assemblies for internal combustion engines or the like include a replaceable filter element that is housed within a housing that is secured to an internal combustion engine. Typically, a bottom portion of the housing is secured to, or integral with, the engine block. A top portion of the housing, or filter cap, is detachable from the bottom portion of the housing to allow the filter element to be replaced when it has met its useful service life.

SUMMARY

An oil filter assembly is provided comprising: an oil filter housing defining an oil filter chamber adapted to receive an oil filter element, the oil filter housing also defining a port; and a valve assembly received within the port, the valve assembly having a closed position and an open position for draining the chamber of oil associated with the oil filter element. The valve assembly comprises a spring, a valve and a casing disposed about the spring and the plunger. The casing may include a lip retaining the valve in engagement with the casing. Desirably, the lip is formed at an end of the casing and is substantially annular. The casing may define a passageway or a hole for allowing oil to drain from the casing.

In a preferred embodiment, the casing defines a casing chamber and the valve includes a stem and a collar, the lip retaining the collar within the casing chamber. The lip desirably is substantially annular and defines a hole for receiving the stem. With this embodiment, the stem is adapted to be movable by the oil filter to move the valve assembly from the open position to the closed position. In accordance with an alternative embodiment, the lip may define a hole instead for receiving a post or other structure associated with the oil filter element adapted to move the valve assembly from the open position to the closed position.

A method may also be provided herein of producing an oil filter assembly having a housing defining an oil filter chamber adapted to receive an oil filter element. The method comprises the steps of: disposing a casing about a spring and a valve; forming a lip on a leading edge of the casing for retaining the valve in engagement with the casing; and inserting the casing into a port defined by the housing.

In a preferred embodiment, the forming step includes bending the leading edge of the casing inwardly to form the lip and desirably so that the lip is substantially annular. The forming step may also include bending the leading edge of the casing to define a hole to receive a stem of the valve. Preferably, the inserting step includes pressing the casing into a port defined by the housing of the oil filter assembly.

Additional features of the present disclosure will become apparent to those skilled in the art upon consideration of the following detailed description of illustrative embodiments exemplifying the best mode of carrying out the present disclosure as presently perceived.

DETAILED DESCRIPTION OF THE DRAWINGS

Figure 1:
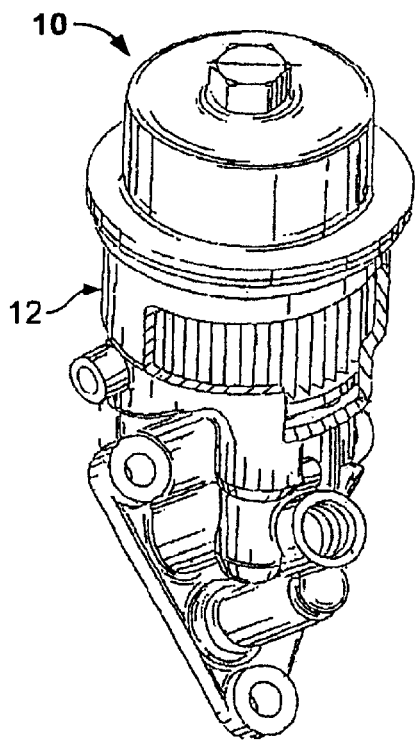
FIG. 1 is a perspective view of an oil filter assembly incorporating a valve assembly in accordance with one embodiment.

While the invention is susceptible to various modifications and alternative forms, specific exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Figure 2:
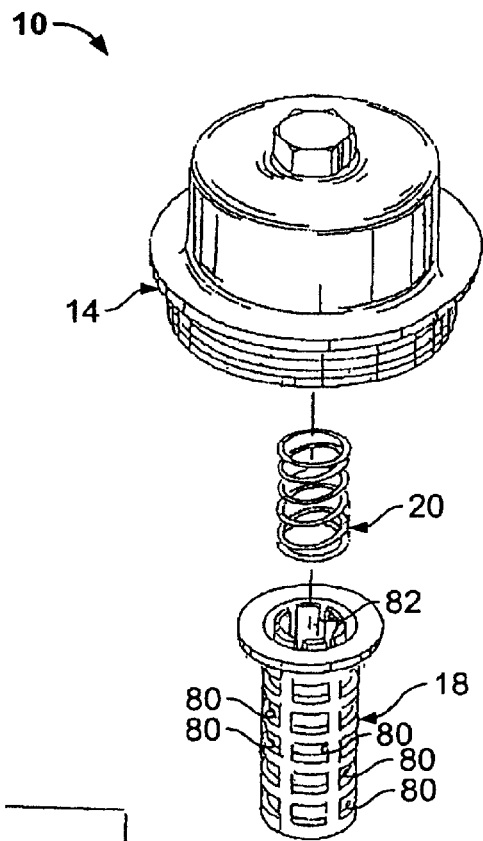
FIG. 2 is an exploded view of the oil filter assembly of FIG. 1.
Figure 2:
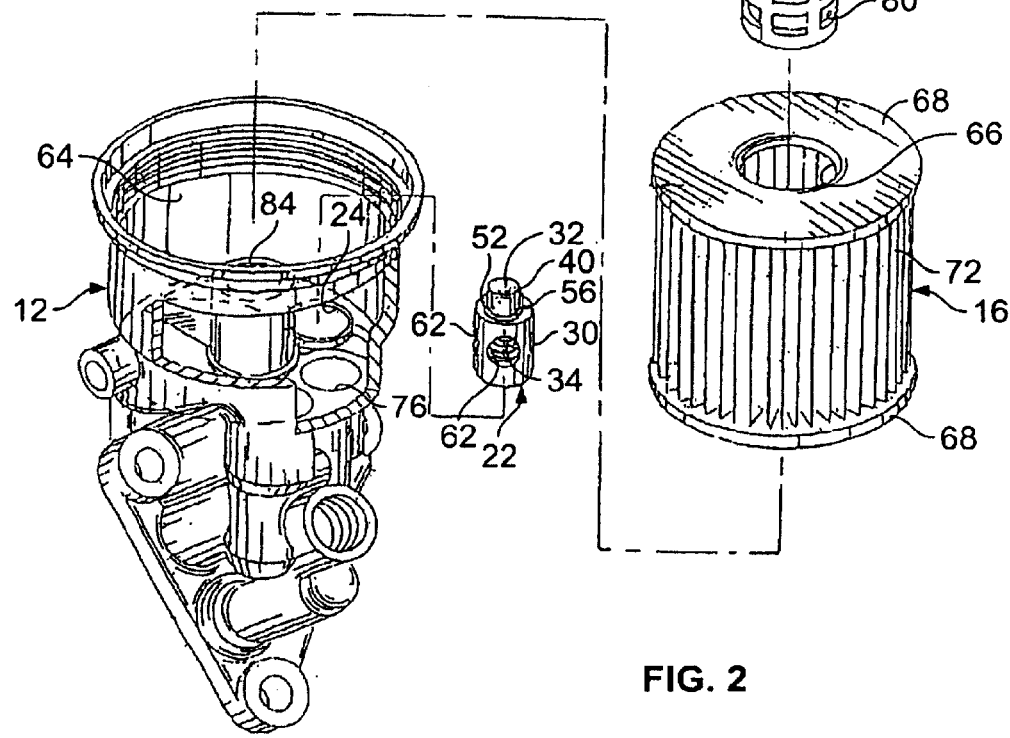

FIGS. 1 and 2 illustrate an embodiment of an oil filter assembly 10. The illustrated oil filter assembly 10 include a housing 12, a filter cap 14, a fluid filter element 16, a center tube 18, a spring 20 associated with the center tube, and a valve assembly 22 received within a port 24 defined by the housing 12. The fluid filter element 16 may be any type of filter for filtering or otherwise removing particles and debris from fluids. For example, the filter assembly 10 may be embodied as a fuel filter assembly, hydraulic filter assembly, air filter assembly, coolant filter assembly, or oil filter assembly.

Figure 3:
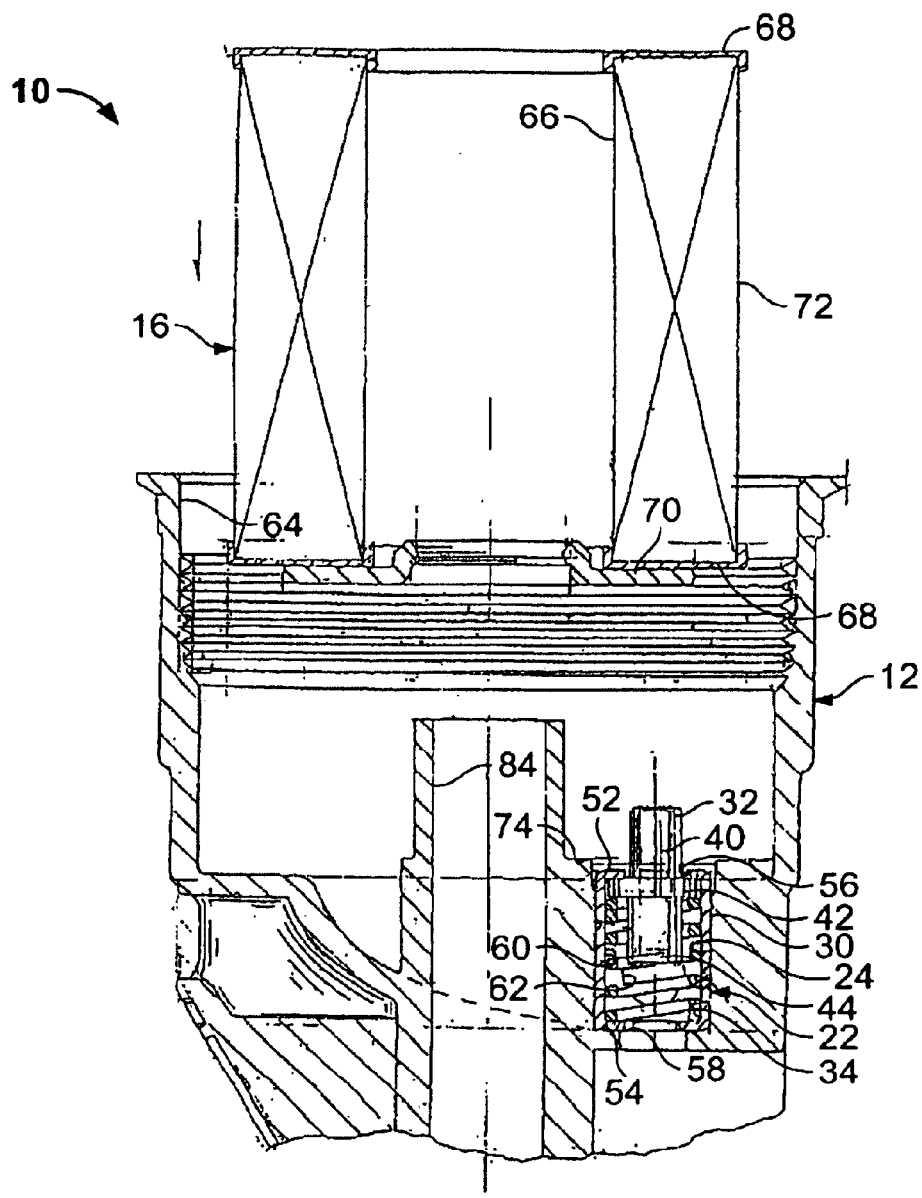
FIG. 3 is a cross-section view of the oil filter assembly of FIG. 1 with the filter cap removed, illustrating the filter element displaced relative to the housing and illustrating in a side elevation view the valve assembly in an open position.
Figure 4:
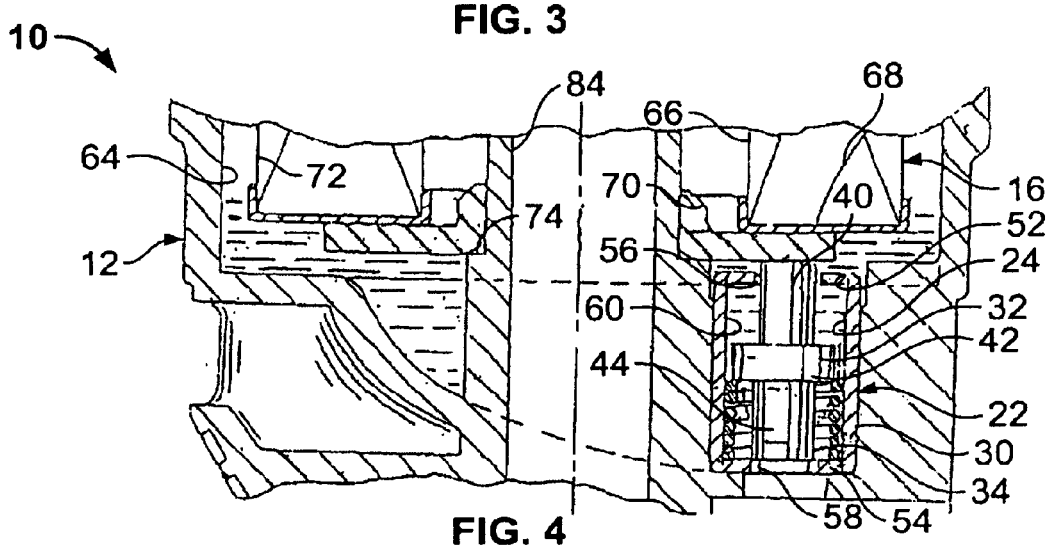
FIG. 4 is a broken view of FIG. 3, illustrating the valve assembly in a closed position and illustrating oil within the chamber defined by the oil filter assembly.
Figure 5:
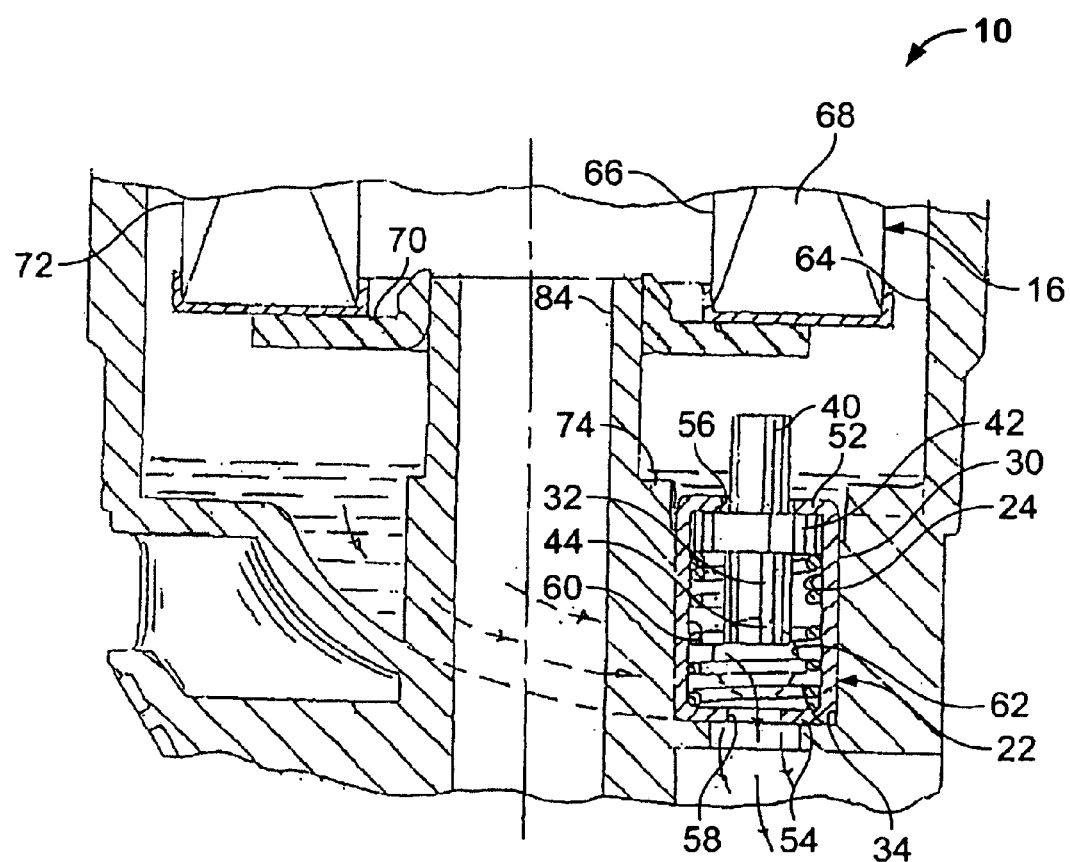
FIG. 5 is a view similar to FIG. 4, illustrating the valve in an open position and illustrating with arrows the flow of oil through the valve assembly.

The valve assembly 22 may have any suitable construction. In the embodiment illustrated in FIGS. 1–5, for example, the valve assembly 22 comprises a casing 30, a valve 32 and a spring 34 associated with the valve. The illustrated valve 32 includes a stem 40, a collar 42 and a valve actuator 44. As seen in FIG. 2 stem 40 is cylindrical and casing 30 is cylindrical with opposed ends having annular lips (FIG. 3) defining holes.

The casing 30 may have any suitable construction and be made of any suitable materials. In a preferred embodiment, for example, the casing 30 is substantially cylindrical and includes a pair of opposed ends which include respective lips 52 and 54. The lips 52 and 54 desirably are substantially annular and define respective holes 56 and 58. In the embodiment illustrated in FIGS. 1–5, the hole 56 receives the stem 40 of the valve. In accordance with an alternative embodiment described hereinafter, the hole 56 may instead receive structure associated with the oil filter element, such as, for example, the post 210 of the filter element 116 of the embodiment illustrated in FIGS. 6–7.

The casing 30 illustrated in FIGS. 2–5 defines a chamber 60 receiving the valve 32 and the spring 34. Additionally, the casing 30 desirably defines a plurality of channels 62 for permitting the passage of oil therethrough.

The filter element 16 may have any suitable construction and configuration. In the embodiment of FIGS. 1–5, for example, the filter element 16 includes a pair of end caps 68, a sealing gasket 70 and a filter medium 72.

The filter element 16 is positioned within a filter chamber 64 defined by the oil filter assembly 10, including the housing 12. If desired, the filter element 16 may be releasably secured within the chamber 64. The filter element 16 illustrated in FIGS. 2–5, for example, defines a tube-receiving channel 66 which receives the center tube 18. The filter cap 14 desirably is screwed onto the housing 12. In such an arrangement, the filter element 16 is sealingly housed within the housing 12 and the filter cap 14.

In the embodiment of FIGS. 1–5, as the housing 12 and filter cap 14 are screwed or otherwise secured together, the bottom of the filter element 16 contacts the valve 32, and in particular the gasket 70 contacts the stem 40, and presses the stem into the chamber 60. The collar 42 of the valve 32 compresses the spring 34. Desirably, when the housing 12 and filter cap 14 are completely secured together, the end of the valve actuator 44 closes or seals hole 58 of the casing 30 to prevent the passage of oil therethrough. The sealing gasket 70 of the filter element 16 desirably is flush or substantially flush with a bottom surface 74 of the housing 12 such that substantially all of the stem 40 of the valve is within the chamber 60 of the casing 30 (see, e.g., FIG. 4).

When the housing 12 and filter cap 14 are secured together, engine oil is advanced through the oil filter assembly 10 during operation of an internal combustion engine (not shown). Specifically, oil is advanced from the oil pan of the engine and into the filter chamber 64 of the housing 12 through an inlet port 76 defined by the housing. Thereafter, the engine oil surrounds the filter element 16 and is directed radially inward through the filter medium 72 of the filter element in a direction toward the center tube 18. Such advancement of the oil through the filter medium 72 of the filter element 16 removes contaminants and other impurities from the oil.

After the oil has been advanced through the filter medium 72, the oil flows through a number of orifices 80 defined by the center tube 18 and into a central passageway 82 of the center tube. Once inside the central passageway 82, the oil is advanced through the channel 84 of the housing 12 and is thereafter routed back to the engine. Hence, as described, engine oil pumped through the oil filter assembly 10 is effectively cleaned during operation of the engine.

When or as the filter cap 14 is unscrewed from the housing 12, the force from the bottom of the filter element 16 is relaxed and the spring 34 of the valve assembly 22 presses the valve 32 outward, which in turn presses the filter element outward. As the valve actuator 44 moves upward, the hole 58 opens up to provide a passageway allowing oil to pass through the hole 58 and outside of the housing 12. The channels 62 of the casing 30 facilitate the passage of oil through the hole 58 to the outside of housing 12.

Figure 6:
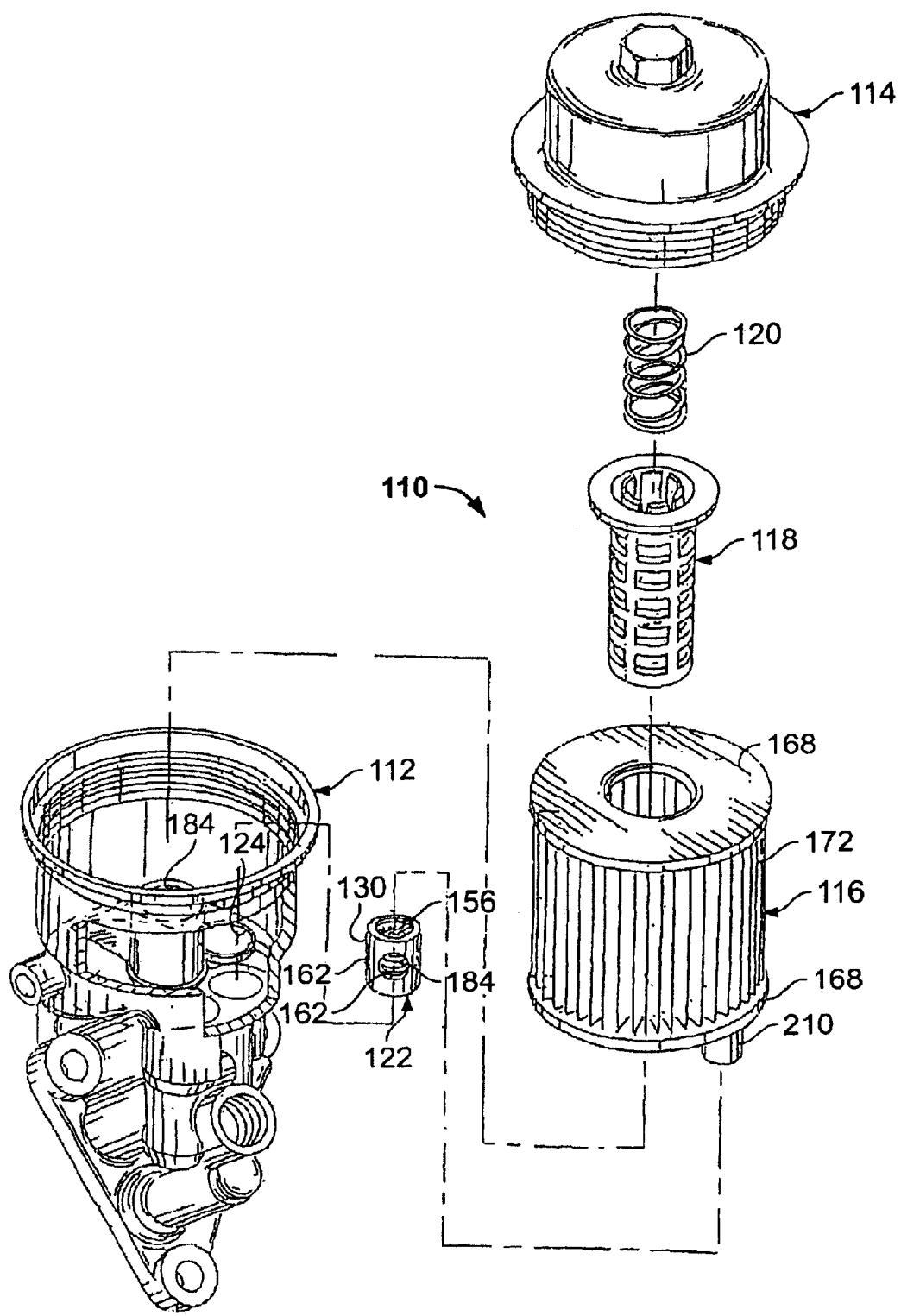
FIG. 6 is an exploded perspective view of an oil filter assembly in accordance with an alternative embodiment of the invention.
Figure 7:
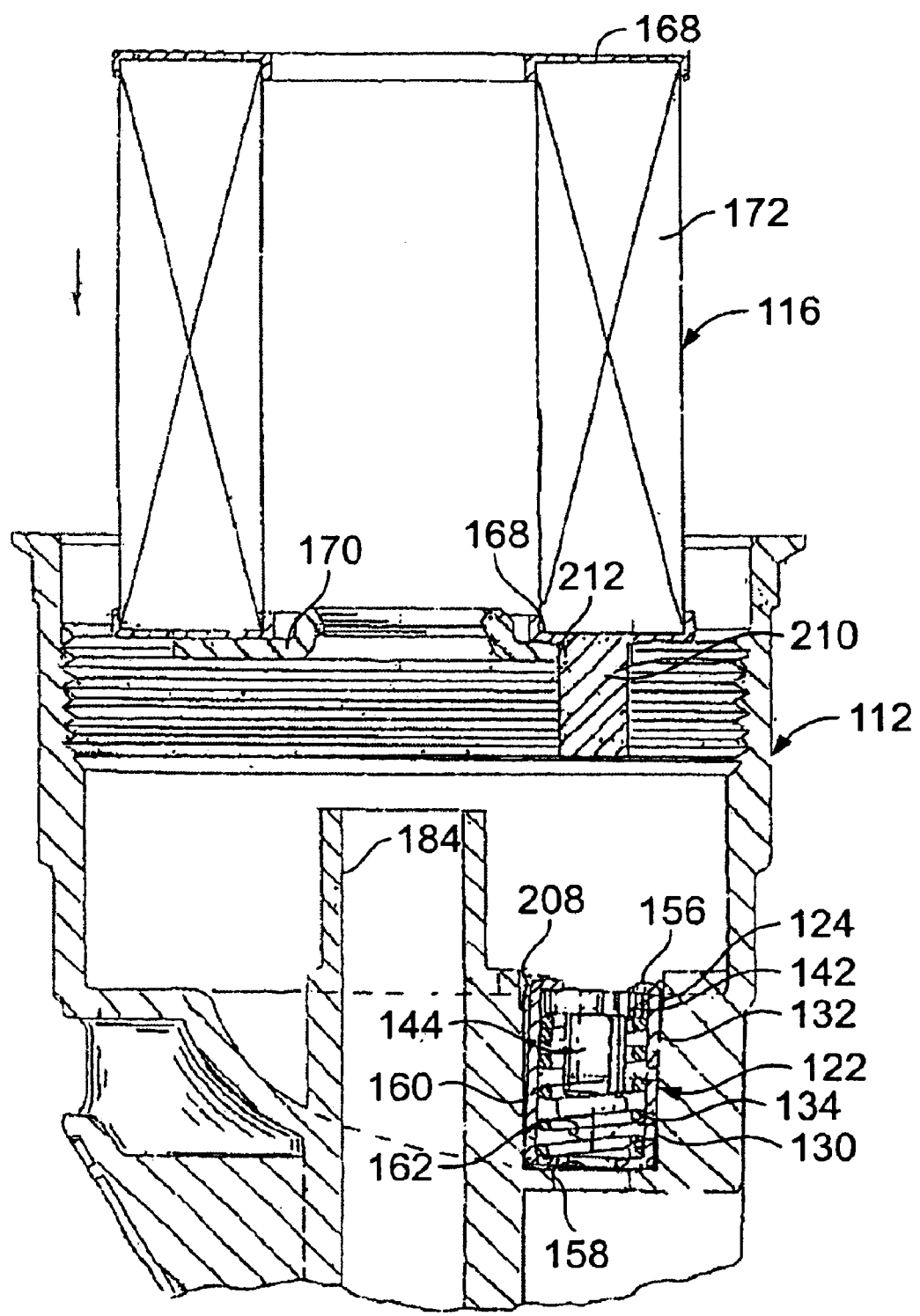
FIG. 7 is a cross-sectional view of the oil filter assembly of FIG. 6, illustrating the filter element displaced relative to the housing and the valve assembly in an open position.

FIGS. 6–7 illustrate an alternative embodiment of an oil filter assembly 110 comprising generally a housing 112, a filter cap 114, a fluid filter element 116, a center tube 118, a spring 120 associated with the center tube, and a valve assembly 122 received within a port 124 defined by the housing 112. The illustrated valve assembly 122 comprises a casing 130, a valve 132 and a spring 134. The illustrated valve 132 is similar to valve 32, except that it does not include the stem 40. The illustrated valve 132 includes a collar 142 and a valve actuator 144.

The filter element 116 may include the pair of end caps 168, the sealing gasket 170 and the filter medium 172. A structure that may have any suitable configuration is associated with the filter element 116 in any suitable manner. In the embodiment of FIGS. 6–7, for example, the structure is in the form of a post 210 that is integral with the bottom end cap 168 and extends through a hole 212 defined by the sealing gasket 170. The post 210 may have any suitable configuration that desirably enables the post to actuate the valve assembly. In the illustrated embodiment, for example, the post 210 has a generally cylindrical configuration.

With the embodiment of FIGS. 6–7, as the housing 112 and the oil filter cap 114 are screwed or otherwise secured together, the post 210 is received within the hole 156 and pushes the valve 132 forcing the valve actuator 144 to move toward the hole 158 of the casing 130 to close the hole 158 to prevent the passage of oil through the casing. When or as the filter cap 114 is unscrewed or otherwise disengaged from the housing 112, the spring 134 pushes the valve 132 and the post 210 upward to permit the flow of oil through the casing 130 and through the hole 158 of the casing. The channels 162 of the casing 130 facilitate the passage of oil through the hole 158 to the outside of housing 112.

While preferred embodiments have been illustrated and described in detail in the drawings and foregoing description, such illustrations and descriptions are to be considered as exemplary and not restrictive in character, it being understood that only illustrative embodiments have been shown and described and that all changes and modifications that come within the spirit of the invention are desired to be protected. There are a plurality of advantages of the present disclosure arising from the various features of the filter assembly and associated method described herein. It will be noted that alternative embodiments of the filter assembly and associated method of the present disclosure may not include all of the features described yet still benefit from at least some of the advantages of such features. Those of ordinary skill in the art may readily devise their own implementations of a filter assembly and associated method that incorporate one or more of the features of the present disclosure and fall within the spirit and scope of the present disclosure as defined by the appended claims.

What is claimed is:

1. An oil filter assembly comprising:
   (a) a filter element;
   (b) an oil filter housing defining a filter chamber receiving the filter element and including a base defining a port, the port including a channel leading to a bottom of the filter chamber and out of the oil filter housing;
   (c) a cylindrical casing disposed within the port having a height equal to the height of the port, the casing including a first end having a radially inwardly extending annular lip defining an opening, a second end having a radially inwardly extending annular lip defining an opening and an opening between the ends in fluid communication with the channel of the housing;
   (d) a valve positioned in the casing and having a cylindrical collar coaxially arranged within the casing with a diameter larger than the casing openings, the valve including a stem attached to an upper side of the collar and extending through the first end opening of the casing for contacting a lower end of the filter element, the valve movable between an open and a closed position, the valve also including a plunger extending from a lower side of the collar configured to sealingly cover the second end opening of the casing when the valve is in the closed position; and
   (e) a spring within the casing and having an end abutting one side of the collar and an end abutting an annular lip for biasing the valve toward the open position such that said plunger is spaced apart from the second end opening of the casing to permit flow from the filter chamber to the port channel.

2. An oil filter assembly comprising:
   (a) an oil filter housing defining an oil filter chamber adapted to receive an oil filter element, the oil filter housing also defining a port; and
   (b) a valve assembly received within the port, the valve assembly having a closed position and an open position for draining the chamber of oil associated with the oil filter element, the valve assembly comprising
      (i) an elongated casing in the port, the elongated casing having two ends with an entrance opening between the two ends and an exit opening at one end
      (ii) a plunger for closing the exit opening and movable between the two ends, the plunger having a collar
      (iii) a spring biasing the collar and plunger toward the open position
   wherein the plunger is movable within the casing between an open position at one end of the casing wherein oil from the oil filter chamber enters the casing through the entrance opening and a closed position at the other end of the casing wherein the plunger closes the exit opening and oil in the casing is prevented from leaving.

3. The oil filter assembly of claim 2 wherein the casing includes a lip retaining the valve in engagement with the casing.

4. The oil filter assembly of claim 3 wherein the lip is formed at an end of the casing.

5. The oil filter assembly of claim 3 wherein the casing defines a casing chamber, the lip retaining the collar within the casing chamber.

6. The oil filter assembly of claim 5 wherein the lip defines a hole receiving a stem, the stem adapted to be movable by the oil filter element to move the valve assembly from the open position to the closed position.

7. The oil filter of claim 6 wherein the stem has a cylindrical shape.

8. The oil filter of claim 6 wherein the collar is larger dimensioned than the hole so that it is retained within the casing chamber and wherein the stem has a cylindrical shape.

9. The oil filter assembly of claim 3 wherein the lip is substantially annular.

10. The oil filter assembly of claim 2 wherein the casing two ends define a substantially cylindrical casing chamber, one end of the casing including a substantially annular lip retaining at least a portion of the valve within the casing chamber and the other end of the casing defining a passageway for allowing oil to drain from the casing.

11. An oil filter assembly comprising:
    (a) an oil filter housing defining an oil filter chamber adapted to receive an oil filter element, the oil filter housing also defining a port; and
    (b) a valve assembly received within the port, the valve assembly having a closed position and an open position for draining the chamber of oil associated with the oil filter element, the valve assembly comprising
       (i) a casing in the port, the casing having first and second ends with an opening at the second end, at least the first end of the casing having a lip extending into the opening and the casing having another opening intermediate the ends
       (ii) a plunger including a collar
       (iii) a spring biasing the collar and plunger toward the open position
    wherein the plunger is movable within the casing between an open position at the first end of the casing wherein the collar abuts the lip and oil from the oil filter chamber flows into and exits through the casing and a closed position at the second end of the casing wherein the plunger closes the opening at the second end and oil in the oil filter chamber and casing is prevented from exiting.

12. The oil filter assembly of claim 11 wherein the casing defines a passageway for allowing oil to drain from the casing.

13. The oil filter assembly of claim 11 wherein the casing defines a substantially cylindrical casing chamber, the lip retaining the collar within the casing chamber.

14. The oil filter assembly of claim 11 wherein the lip is substantially annular.

15. The oil filter assembly of claim 11 wherein the casing has two ends and defines a casing chamber, one end of the casing including a substantially annular lip retaining the valve within the casing chamber and the other end of the casing defining a passageway for allowing oil to drain from the casing.

16. The oil filter assembly of claim 15 wherein the substantially annular lip retains the collar within the casing chamber and defines a hole receiving a stem, the stem movable by the oil filter element to move the valve assembly from the open position to the closed position.

* * * * *